Oct. 27, 1925.
J. H. BARNARD
1,559,301
INTERNAL COMBUSTION ENGINE
Filed June 17, 1924   5 Sheets-Sheet 1
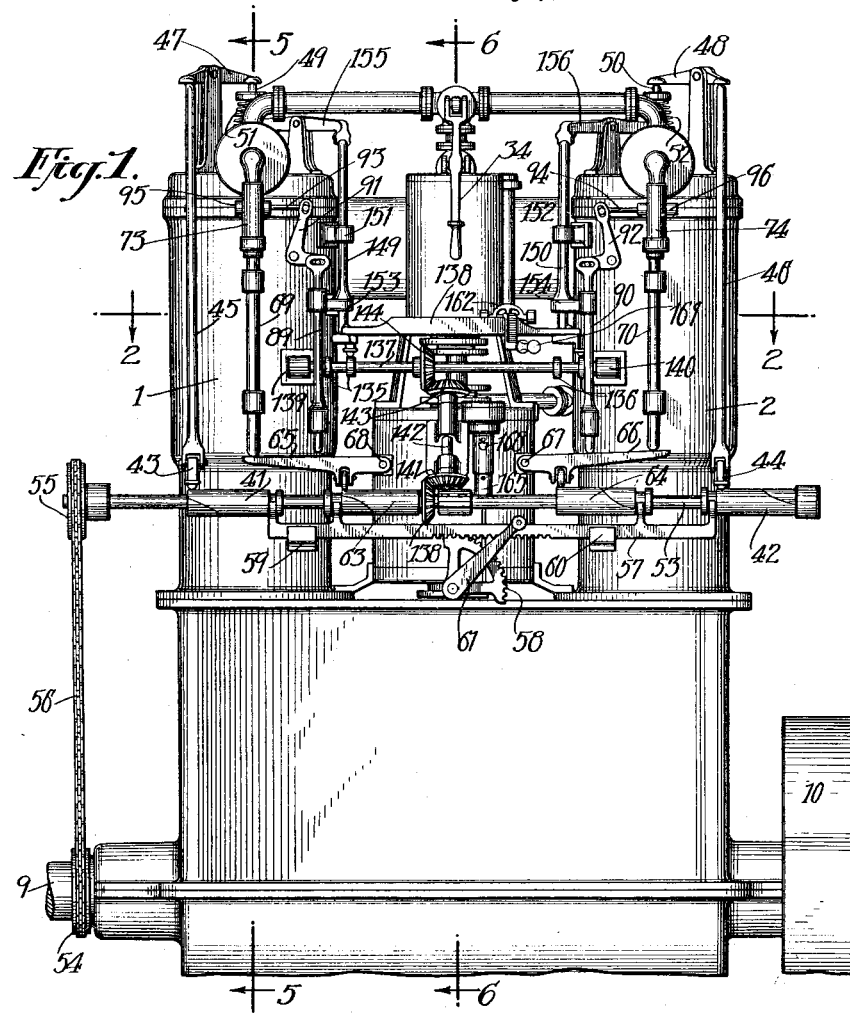
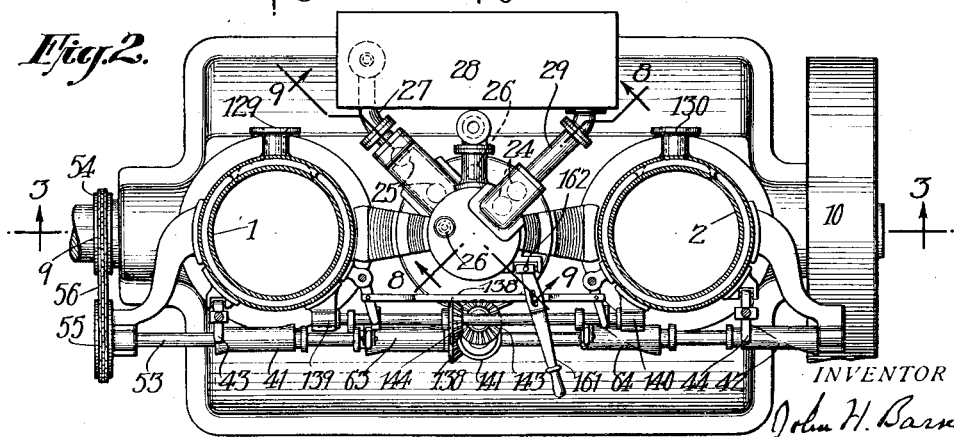
INVENTOR
John H. Barnard
BY
Cornelius C. Billings
his ATTORNEY Oct. 27, 1925.  
J. H. BARNARD  
INTERNAL COMBUSTION ENGINE  
Filed June 17, 1924  
1,559,301  
5 Sheets-Sheet 2

INVENTOR
John H. Barnard
BY Cornelius C. Billings
ATTORNEY

Oct. 27, 1925.  
J. H. BARNARD  
INTERNAL COMBUSTION ENGINE  
Filed June 17, 1924  
1,559,301  
5 Sheets-Sheet 3
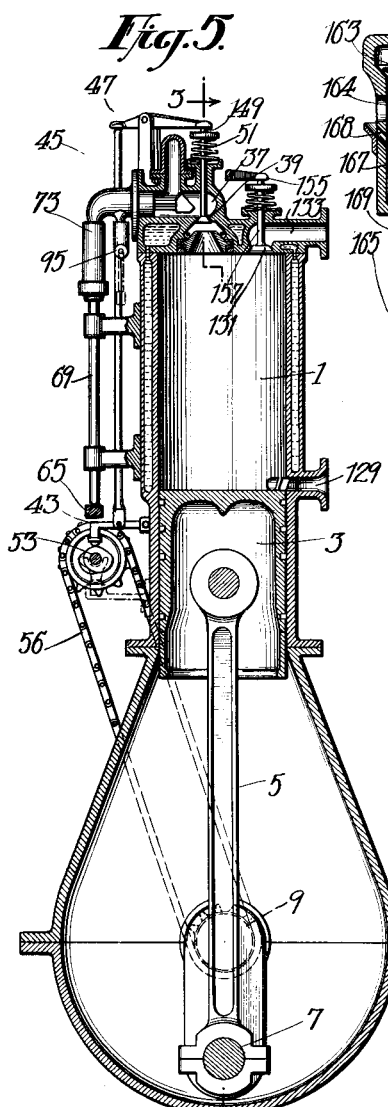
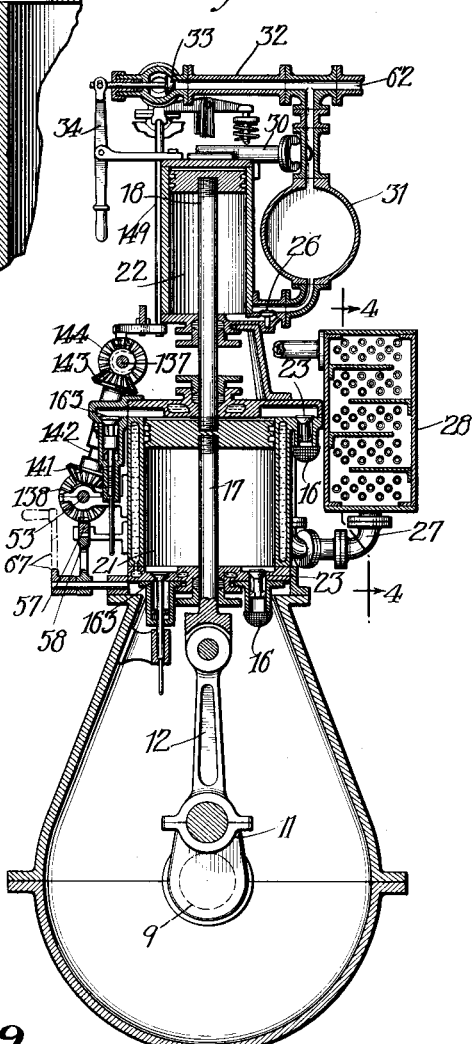

Oct. 27, 1925.
J. H. BARNARD
INTERNAL COMBUSTION ENGINE
Filed June 17, 1924    5 Sheets-Sheet 4
1,559,301
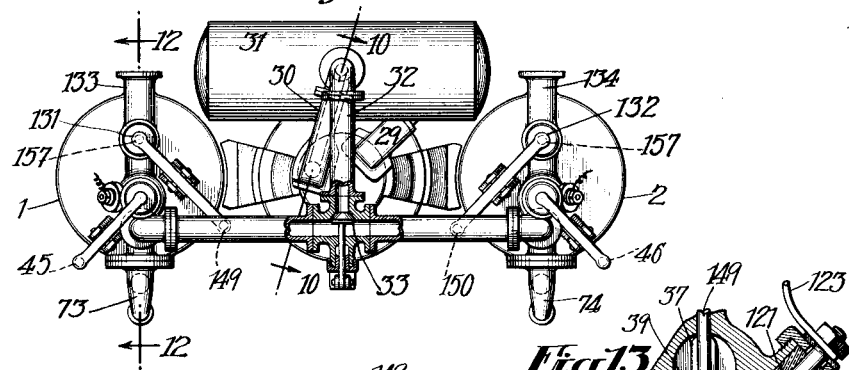
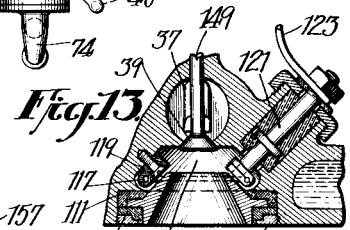
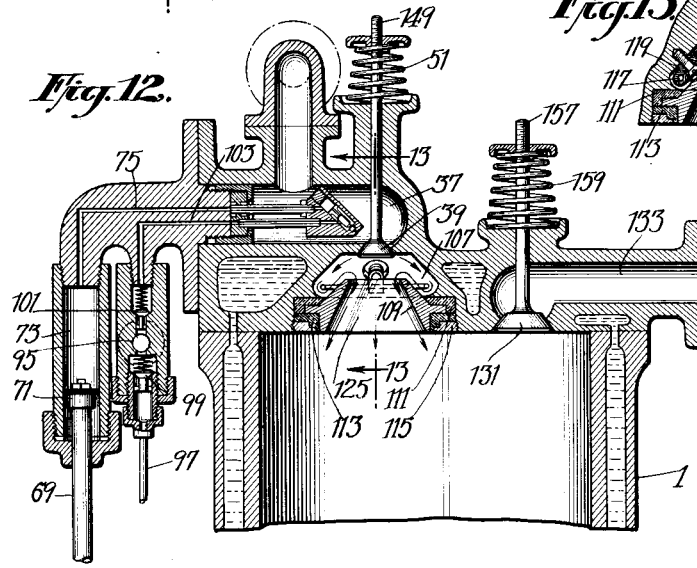

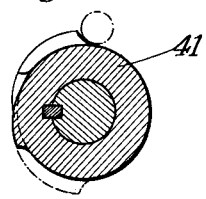
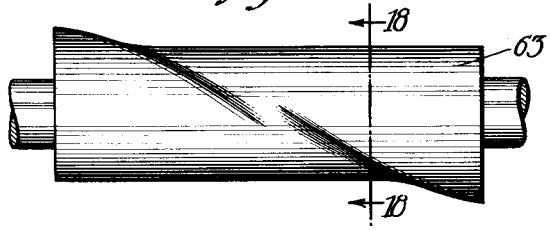
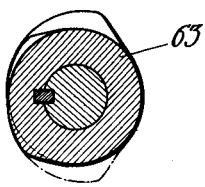
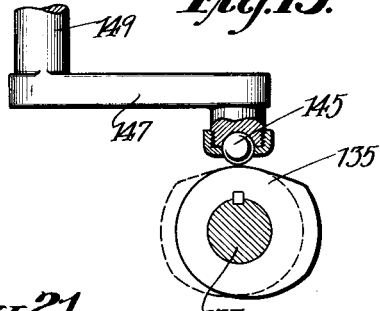

Patented Oct. 27, 1925.

1,559,301

UNITED STATES PATENT OFFICE.

JOHN H. BARNARD, OF BROOKLYN, NEW YORK, ASSIGNOR OF ONE-FOURTH TO HENRY NOBLE FLETCHER, OF ENGLEWOOD, NEW JERSEY.

INTERNAL-COMBUSTION ENGINE.

Application filed June 17, 1924. Serial No. 720,572.

*To all whom it may concern:*

Be it known that I, JOHN H. BARNARD, a citizen of the United States, and a resident of the borough of Brooklyn, city and State of New York, have invented certain new and useful Improvements in Internal-Combustion Engines; of which the following is a specification.

The engine described in this application is of the same type as that described in my co-pending applications filed March 8, 1919, Serial No. 281,364, renewed November 10, 1922, Serial No. 600,184 and Serial No. 600,877 filed November 14, 1922, and this application is a continuation in part of my said prior applications, and applications Serial No. 647,963, filed June 27, 1923, and Serial No. 698,796, filed March 12th, 1924.

The construction now shown embodies improved features which are deemed by me to constitute more satisfactory combined means for accomplishing the same ends and purposes as are set forth in the said prior applications.

Although this engine may be built to follow the 4-stroke cycle, its almost perfect scavenging as a 2-stroke engine peculiarly fits it for that cycle. This feature arises from the fact that neither a combustible mixture nor even the air necessary to combustion is compressed within the power cylinders. In consequence, these may be, and should be, designed with the same minimizing of clearances as is practiced in building compressors and a result of this is, that, during the return of the pistons after a power stroke, practically, the last of the products of combustion is displaced through an auxiliary exhaust valve which is provided for this purpose.

Instead of effecting any compression in the power cylinders I provide any suitable means for compressing specific quantities of air to a designed and constant pressure, which quantities are varied in accordance with operating requirements. This compressed air is admitted to the power cylinders in a definite manner during variable and governable fractions of the power stroke and, during this period of admission, is sprayed with fuel delivered at a rate proportional to the travel of the power pistons during the desired period of air admission. During this set and governable period of admission, the fuel content combines with its accompanying air and burns at a constant pressure closely approximating that to which the air has been compressed. So constant are the pressure and temperature during this period that it is entirely credible that conversion takes place on a constant pressure-constant temperature cycle. So controllable is the ratio of air and fuel, and through such wide ranges of proportion of air to fuel may this combustion be accomplished that thermal stresses may be limited to suit metallurgical requirements in very large power cylinders.

Among the unusual and valuable features of this engine are; the high ratio borne by the mean piston pressure to the maximum pressure developed upon it with a consequent reduction of all maximum stresses for given power output at equal speeds of operation, its exceptional flexibility, its satisfactory performance at unusually low piston speeds and its ability to develop high starting torques.

These characteristics may best be visualized by viewing this engine in its similitude to an air motor wherein the volume of the air employed is increased by the elevation of its absolute temperature through its chemical combination with the fuel. Under this conception it is easily seen that there may be anticipated those characteristics which differentiate a reciprocating steam engine from those of the internal combustion type and these are realized in this development. It will further be noted that this elevation of the temperature of the air after compression may be partially effected by a utilization of some of the heat ordinarily rejected in the exhaust.

From what has preceded, and from the further description of this engine, it will follow that the means disclosed may be employed in such a variety of constructions that the particular forms shown in the accompanying drawings do not constitute a limitation to those which may be utilized to the ends I describe.

Fig. 1 is a front elevation showing the arrangement of the power and compressor cylinders together with the details of operation and control.

Fig. 2 is a plan view partly in section on line 2—2 of Fig. 1, showing the details of operation and control.

Fig. 5 is a vertical cross section of one of the power cylinders on line 5—5 of Fig. 1.

Fig. 6 is a vertical cross section of the two-stage air compressor as shown on the line 6—6 of Fig. 1.

Fig. 7 is an enlarged detail of one of the unloading valves shown attached to the first-stage compressor cylinder in Fig. 6.

Fig. 8 is a detailed section of the second-stage compressor cylinder as shown on the line 8—8 of Fig. 2.

Fig. 9 is a detailed section of the first-stage compressor cylinder as shown on line 9—9 of Fig. 2.

Fig. 10 is a detailed section of the head of the second-stage compressor cylinder as shown on the line 10—10 of Fig. 11.

Fig. 11 is a plan of the tops of the power and compressor cylinders showing the air cylinders and the piping from the receiver to the power cylinders.

Fig. 12 is an enlarged section of the cover of one of the power cylinders shown on the line 12—12 of Fig. 11.

Fig. 13 is a sectional detail of the ignition device, for starting, as shown on the line 13—13 of Fig. 12.

Fig. 14 is a detailed section of the fuel supply nozzle.

Fig. 15 is an elevation of one of the spiral cams employed for the proper operation of the admission valves.

Fig. 16 is a cross section of the cam shown in Fig. 15 taken on the line 16—16 of that figure with the nearer end shown in dash lines.

Fig. 17 is an elevation of one of the spiral cams employed for operating the fuel pumps.

Fig. 18 is a cross section of the cam shown in Fig. 17 on the line 18—18 of that figure with the nearer end shown in dash lines.

Fig. 19 is an enlarged detail view of a toe of one of the push rods for operating the auxiliary exhaust valves with the ball roller resting upon one of the cams provided for its operation in which view the cam for reverse direction is shown in dot and dash lines.

Fig. 20 shows a careful reproduction of an actual indicator card taken with a receiver pressure of 64 lbs. per square inch (45 grammes per sq. millimeter) with the admission valve beginning to close at 60 degrees and fully closed at 72 degrees of crank angle.

Fig. 21 shows a similar card calculated with a receiver pressure of 175 lbs. per square inch (122½ grammes per square millimeter) with the admission continuing through 17½% of the total stroke.

Figure 3:
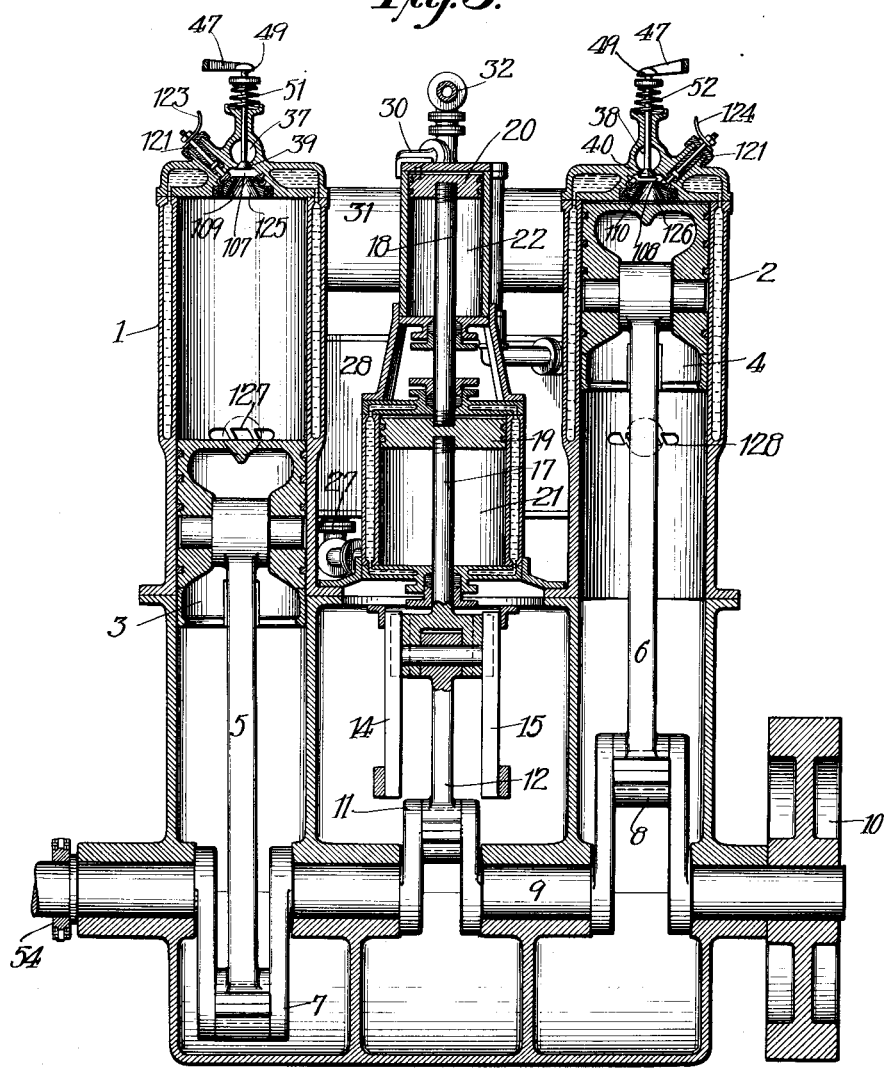
Fig. 3 is a vertical longitudinal section on the line 3—3 of Fig. 2, offset, as shown by the line 3—3 of Fig. 5.
Figure 4:
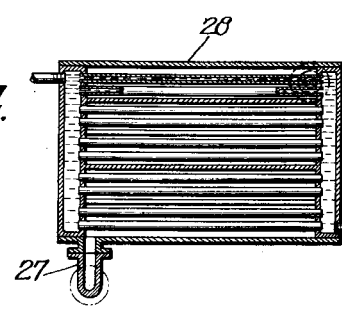
Fig. 4 is a longitudinal section of the interstage cooler on the line 4—4 of Fig. 6.

In other types of internal combustion engines certain inherent conditions dictate the initial cylinder pressures wherefrom a resulting mean pressure is realized. In this one however the former may be chosen to afford the best compromise between the thermal advantages of a high initial pressure and the important commercial gains through lower initial pressures longer sustained. Under certain conditions there may well be selected an initial pressure of 200 lbs. per sq. in. (140 grammes per sq. millimeter). Other requirements may be better satisfied by an initial pressure of 150 lbs. per sq. in. (105 grammes per sq. millimeter). As either of these is high for single stage compression and as both lie within good practice for 2-stage compression, it appears convenient to adopt as units two single acting power cylinders combined with a 2-stage compressor of suitable size to supply both with so much air as will result in whatever terminal pressure may be desired. Then, for engines of four or six, or more, power cylinders, two or three, or more, of these units may be so connected as to afford the best crank arrangement, their receivers may be connected in parallel while such accessories as circulating pumps, etc., may be combined or interconnected.

For these reasons the drawings herein included cover such a unit and, as the various parts of the two power cylinders are substantially duplicates of each other, the reference numbers run in pairs with the odd numbers assigned to the parts of the odd numbered cylinder and the even ones to those of the even numbered cylinder. Similarly, with regard to the two compressor cylinders, the odd numbers of each pair are applied to the parts of the 1st-stage cylinder and the even ones to like parts of the second stage cylinder. The same designations are employed for the same part in all the drawings in which such part appears.

1 and 2 are the two water jacketed power cylinders in which reciprocate the pistons 3 and 4, coupled by the connecting rods 5 and 6 with the cranks 7 and 8 of the shaft 9, borne in suitable bearings, and to which is keyed the fly wheel 10.

Driven by the crank 11 and the connecting rod 12 is the cross head 13 traveling on the guides 14 and 15. By attachment with the cross head 13, and through the piston rods 17 and 18, there are driven the pistons 19 and 20 in the water jacketed 1st-stage compressor cylinder 21 and the lagged 2nd-stage compressor cylinder 22, respectively.

The first of these two cylinders takes air at atmospheric pressure, and temperature through the strainers 16, 16 (Fig. 6) and the suction valves 23, 23 and compresses it through the discharge valves 25, 25 (Fig.

9) and the connection 27 into the interstage cooler 28 (Fig. 6) at higher pressure and temperature. Suppose these to be 45 lbs. per sq. in. (31.6 grammes per sq. millimeter) and 102 degrees C. Presume that the temperature be reduced at constant volume to 22 degrees C. bringing the pressure down to 32 lbs. per sq. in. (22.5 grammes per sq. millimeter) at which figures it is taken through the connection 29 (Fig. 8) and the second stage suction valves 24, 24 into the cylinder 22. Here it is compressed through the 2nd-stage discharge valves 26, 26 (Figs. 6 and 10) and the connection 30 (Fig. 10) into the receiver 31 at, say 175 lbs. per sq. in. (122.5 grammes per sq. millimeter) and at 171 degrees C.

Let it be presumed, further, that the power cylinders are to be operated at the low working temperature of 1371 degrees C. or 1643 degrees C., absolute. The air from the second stage compressor cylinder is at 443 degrees C., absolute, so that, the delivery of compressed air per stroke must be $\frac{443}{1643}$ × total volume of a power cylinder to the point of cut-off when the engine is working at rated load. From this there is readily determined the requisite volumetric capacities of the two compressor cylinders and there can be calculated the quantity of fuel, per stroke, necessary to raise this amount of air to the desired working temperature. And, towards lessening this requirement of fuel this air can be raised somewhat in temperature by waste heat from the main exhaust. From the receiver, 31, the compressed air fills the pipe 32 (Figs. 6 and 11) and may be passed by the throttle valve 33, which is operated by the lever 34. Thence it is permitted to reach the mixing chambers 37 and 38 (Figs. 3, 5 and 12) where it awaits the openings of the admission valves 39 and 40.

These admission valves are operated by the cams 41 and 42 (Figs. 1 and 2) through the contact levers 43 and 44, the push rods 45 and 46 and the rocker arms 47 and 48, acting on the valve stems 49 and 50 against the springs 51 and 52. The cams 41 and 42 are shown in detail in Figs. 15 and 16. Their middle zone is practically circular. The sections towards one end are for employment in operating in one direction and those toward the other for operation in the reverse direction. From the middle zone, toward each end, the profiles all begin at a fixed angular distance of some 15 degrees in advance of the central plane through the radius TC but extended through increasing angular distances until they form the end sections shown by the full lines and the dot and dash lines in Fig. 16. They are slidably mounted on the feathered shaft 53 which is driven in unison with the crank shaft, 9, by the sprocket wheels 54 and 55 and the sprocket chain 56. On this shaft 53 they may be moved by the arms of the rack 57 operating in the guides 59 and 60 by engagement with the tooth quadrant 58 which is actuated by the crank 61, bringing any desired section under contact levers 43 and 44.

The purpose of beginning the profiles in advance of the central plane through the radius TC is to cause the admission valves to open enough in advance of top center to fill the cylinder clearances enough to cushion the pistons in their final upward travel. From TC the ordinates of the cam profiles increase in proportion to the increasing rate of piston travel, so that, for any particular engine speed, the rate of flow past the admission valve is constant throughout any set period of follow. Beyond the point at which the piston speed reaches its maximum these ordinates decrease proportionately in order to maintain this rate of flow.

The cams 63 and 64 in Figs. 1 and 2, for producing the fuel spray, are of like general form and are shown in detail in Figs. 17 and 18. The profiles of these cams begin somewhat more in advance of the central plane through the radius for a reason set forth in the description of the spraying system which follows. The essential difference between these cams and those for operating the admission valves is that the ordinates of the profiles of these cams beyond TC increase by amounts proportional to the ever increasing volume above the piston throughout the longest period of follow.

In contact with these fuel cams, are the rollers of the rocker arms 65 and 66 pivoted at 67 and 68 (Fig. 1). During contact with so much of the profile as is in advance of the first movement of the admission valves, these rocker arms raise the push rods 69 and 70 (Fig. 1) initiating a movement of the plungers 71 and 72 (Fig. 12) in the air barrels 73 and 74 whereby there is begun a flow of the compressed air previously sucked therein. This flow is through the channels by which it entered, namely the drilled passages 75 and 76, the pipes 77 and 78 the air chambers 79 and 80 the eccentric passages 81 and 82 the fuel chambers 83 and 84, the 1st-stage orifices 83$^a$ and 84$^a$, the spray chambers 85 and 86 and the discharge orifices 87 and 88 and is drawn from the hot compressed air in the mixing chambers 37 and 38. By the time that the admission valves begin to open these rocker arms have engaged the push rods 89 and 90 (Fig. 1) which actuate the bell cranks 91 and 92 driving the plungers 93 and 94 of the fuel pumps 95 and 96 (in same figure). These pumps are filled with fuel from a pressure, or gravity tank, which is not shown, through the supply pipes 97 and 98 of which the former is shown in Fig. 12. As shown in that figure these pumps are provided with automatic suction and discharge valves. The former, as 99, is of ample size lightly spring loaded. The latter, as 101, is small and more heavily spring loaded. The action of the pump plunger is to expel this fuel through the drilled passages 103 and 104 and the connecting pipes 105 and 106 into the fuel chambers 83 and 84, of which 103, 105 and 83 are shown in Figs. 12 and 14. In these fuel chambers aeration occurs and the mixture of air and fuel are discharged as a spray through the discharge orifices 87 and 88 into the stream of combustion air sweeping through the admission valves 39 and 40. Beyond these valves the mingled stream of combustion air and finely sprayed fuel enters the ignition chambers 107 and 108 above the hollow, cone shaped baffles 109 and 110. These baffles are heat insulated from the metal of the cylinder covers by the insulating rings 111 and 112 and 113 and 114 of which the first named of each pair are shown in Fig. 12. They and the baffles are secured in place by the locking rings 115 and 116. Shortly after operation has been begun those baffles become heated by surrounding combustion and serve to ignite each successive charge, but, to originate operation, there are provided the resistance wire rings 117 and 118 of which the former is shown in Fig. 13. For this a nichrome wire of about .1144 inch which equals 2.9 millimeters diameter has sufficed. On one point on their periphery these are supported and grounded to the metal of the cylinder cover by the clamp shown as 119 in Fig. 13. Diametrically opposite, this ring is clamped and supported from the insulated spindle shown in that figure as 121. It is supplied from any convenient source of low tension current by the conducting wire shown in the foregoing figure as 123. Upon development of ignition of the fuel in the presence of a sufficient accompaniment of air the volume of the entering mixture is increased in proportion to its elevation of temperature on the absolute scale. It cannot expand back into the mixing chambers because of the speed of the incoming flow which, at the expense of a negligible drop of pressure through the admission valves, is higher than the rate of flame propagation even when the engine is running at very low fractions of its rated speed. In expanding, and escaping, into the cylinders it is forced to flow back to cross the lips of the baffles into the combustion chambers 125 and 126. Into this counter-flowing flame, follows all the continuing stream of air and fuel as long as the admission valves remain unclosed and, by means of the graduated movement of these valves, as above described, and by means of delivering the fuel at a rate proportional to the increase of volume above the power pistons, there is secured the constancy of pressure shown in the admission line of Fig. 20 which is a careful trace of one of many equally good cards actually obtained. By the simultaneous shifting of the admission and fuel cams, through moving the rack 57, wide variations of the period of follow can be obtained. For starting purposes the lengths of the cams 41, 42, 63 and 64 depend upon the number of cylinders. For an engine of four power cylinders, of which these drawings show one pair, some one of the power pistons will be within (about) 90 degrees of top center. In consequence these cams are shown with sections having profiles as long as 100 degrees. To insure ample air for starting, the receiver 31 can be connected through the opening 62 with a bank of storage tanks.

Having started with full follow the cams are promptly shifted to the running positions indicated by the intermediate sections shown by the dashed lines in Figs. 16 and 18 to produce the calculated card shown in Fig. 21. For lighter loads, or for lower speeds, the cams can be shifted to cause an earlier cessation of air and fuel. For automatic speed regulation this shifting can be caused by any of several usual forms of regulating devices. After cut-off the hot products of combustion expand somewhat adiabatically until the power pistons uncover the ports 127 and 128 releasing them, through the exhaust connections 129 and 130, of which the former is shown in Fig. 5. Thence they may be led through suitable piping in the receiver 31 that they may give up some of their remaining heat to the air stored therein.

Prior to these ports being, again, closed on the up-stroke of the power pistons, there are opened the auxiliary exhaust valves 131 and 132 through which nearly all the remaining products of combustion are displaced by the upstroke of the power pistons which expel them through the auxiliary exhaust connections 133 and 134. The first named of each of these two pairs are shown in Fig. 12.

These auxiliary exhaust valves are operated by the pairs of cams 135 and 136 fixed on the cam shaft 137 revolving in the bearings 139 and 140, (Figs. 1 and 2). A pair of these cams are shown as 135 in Fig. 19. That in full lines being for operation in one direction and that in dashed lines being for operation in reverse direction. The shaft 137 is driven from the bevel gear 138, fixed on the shaft 53. This drives the bevel gear 141, the attached spindle 142, to which is fixed the bevel gear 143 meshing with the bevel gear 144 keyed to the shaft 137.

Resting on one of each pair of cams are the ball rollers 145 and 146 carried by the toes 147 and 148 of the push rods 149 and 130

150 (Fig. 1). An enlarged view of the toe and roller as 147 and 148 is given in Fig. 19. These push rods are carried in the guides 151, 152, 153 and 154 in Fig. 1. They actuate the rocker arms 155 and 156, depressing the valve stems 157 and 158, in Figs. 11 and 12 against springs surrounding these stems of which 159 is shown in Fig. 12.

To shift these rollers and toes to the other cams of the pairs there is provided the tie bar 138 (Fig. 1) swung by the lever 161 pivoted on the gimbals 162 (Fig. 2).

Because this engine will require less air when operating on a shorter follow than is required at rated power and to limit the amount compressed when operating on fractional loads there are provided for the 1st-stage compressor cylinder the unloading valves 163, 163 shown in Fig. 6 and the enlarged detail of one of these in Fig. 7.

Referring to that drawing 163 is a poppet valve with its stem 164 fitting in the barrel 165 which is connected with the receiver 31 by the pipes 166. On this stem is the tray 167 which may be loaded through the spout 168 to such an extent that when there is exactly the desired pressure in the receiver the valve is just heavy enough to remain seated. When there is less than that pressure the valve remains permanently closed but when the receiver pressure exceeds the desired amount this valve is floated from its seat and no compression occurs. Any slight leakage from the barrel 165 around the stem 164 escapes through the port 169.

An essential to a desired ratio of fuel and air throughout the period of admission and to the constancy of pressure during that time is that the fuel shall be finely sprayed and this through a range of delivery rate which shall closely approximate the rate of increase of the volume above the power piston. As has heretofore been set forth the desired rate of delivery is effected by the profile calculated for the cam shown in Figs. 17 and 18.

The rate of delivery being so accomplished, fine pulverization is secured through this range of rate by the spraying device shown herein where air at mixing chamber pressure and temperature is drawn into the barrel 73 during the suction stroke of the plunger 71. At the same time fuel is drawn through the valve 99. The first motion of the rocker arms 65 pushes upward the plunger 71 further compressing the air in the barrel 73 causing a slight rise in its temperature and a flow through the orifices 83 and 84 and 87 and 88. Further movement of the rocker arms causes engagement with the push rods 89 and 90 forcing inwards the plungers 93 and 94 ejecting fuel past the valves 101 and 102 into the chambers 83 and 84 where it encounters the air stream flowing from the passages 81 and 82. From the orifices $83^a$ and $84^a$ there issues a spray of mingled air and fuel which is caught in the chambers 85 and 86 where further pulverization takes place before escape occurs through the orifices 87 and 88. Beyond these the spray air resumes pressure and temperature it had before both were raised in the barrels 73 and 74.

It has appeared, from a long series of engine indicator cards taken during the work of development, that the heat cycle followed by this engine is clearly one not suspected by those skilled in this art as being possible and which I cannot find to have been previously described, or even suggested, although the lists and the analyses of heat cycles commonly go as far as to include the still undeveloped cycle known as that of Carnot.

Reference to the standard works on this subject invariably affords three, and no more, concepts of heat cycles arising from the interdependent effects upon gases of three variants pressure, volume and temperature and, usually, these are termed the three "possible" cycles for the development of power in internal combustion engines. These recognized cycles are similar to the extent that, in each, energy is liberated during a period in which one of the variants is temporarily constant while both of the others vary. They differ from one another in that in each a different one of these variants is the temporary constant. Thus there are named, and have been analyzed, the "constant temperature" cycle which Carnot proposed; the "constant pressure" cycle of Brayton, and the "constant volume" cycle of Otto.

With the exhaustion of the cycles in which a single variant exhibits temporary constancy the list ends, yet, there still remain the possibilities of cycles in which any two of the variants might remain constant while only the third varied during the period of heat conversion; but, the consistent lack of suggestion in this direction renders tenable the surmise that it was hardly conceivable that the conditions necessary to the realization of any of the three possible bi-constant cycles could be devised. Further speculation will show that two such are actually impossible because volume could not be paired with either pressure or temperature as neither temperature nor pressure could be varied without disturbing the constancy of the other and volume. Accordingly, there remains the "constant pressure-constant temperature" cycle by which, alone, can the list of possible cycles be extended and, being the only one of such cycles, may be termed, for brevity with conciseness, the bi-constant cycle.

To the realization of this cycle other constructions than that herein described may be devised as, for example, that presented in my previously mentioned co-pending application for patent. In consequence, I do not limit myself to the particular form herein detailed but I would include such other forms as will suggest themselves for producing the conditions which I set forth as being those from which such a cycle results.

That the pressure and temperature are substantially constant, to the point at which fuel delivery ceases and the admission valves close, is demonstrated by admission lines on indicator cards as straight and as level as can be obtained in the best of steam practice and the reason lies in the balancing of the acting pressure in the working cylinders against a steady, re-acting, fluid pressure in the receiver; and, by delivering the components of combustion at the definite rates requisite to fill a varyingly growing volume to the same extent. Further, it is to be appreciated that the mechanical means to this end are materially assisted by the natural phenomena involved. For, if at any period of combustion the pressure should tend to fall this very tendency would result in a correspondingly accelerated flow of air and fuel towards re-establishing the, before mentioned, small pressure difference between the cylinder and the receiver. Conversely, a tendency towards an increase of cylinder pressure would produce a corresponding retarded action in the flow of air and fuel acting to restore this kinetic equilibrium. Similarly, should the temperature tend to fall, or rise, the result would be to lower or raise, the pressure in the momentarily constant volume then occupied, so bringing about one or the other of the two correctives just described. And, it is still further to be realized that so delicate are these inter-actions and the balance in this fluid mass that there are not needed developed variations to bring about the corresponding corrective but the mere tendency towards loss of balance induces the means to its restoration.

Having thus described my invention what I claim as new and desire to secure by Letters Patent is:

1. In an internal combustion engine which comprises power cylinders and pistons therein, means for supplying air under pressure thereto, control valves for said air and cams for opening said valves the profile of which causes changes in the amount of opening, which changes are proportional to the rate of advance of the power pistons.

2. An internal combustion engine which comprises a power cylinder, a fuel injecting piston, a driving cam for said piston the profile of which causes advancements proportional to the accelerating speed of the piston in said power cylinder, and means for admitting a mixture of air and such injected fuel to the said power cylinder in like proportion, thus affording a uniformity of richness of the mixture.

3. An internal combustion engine which comprises power cylinders and pistons, means for compressing and supplying air for combustion to said power cylinders, an admission valve for said air, means for varying the opening of said valve by changes proportional to the changes of speed of the power pistons during a portion of the power stroke.

4. An internal combustion engine which comprises a power cylinder and piston, means for compressing and supplying air for combustion to said power cylinder, an admission valve, for said air, means for opening said valve to amounts proportional to the speed of the piston in said cylinder during a portion of a power stroke and means for the graduated control of the fraction of the power stroke during which said valve is so varied in its degree of openness.

5. An internal combustion engine which comprises a power cylinder and a piston therefor, means for compressing and supplying air to said power cylinder, an admission valve for said air and means driven by said engine for opening said admission valve to an extent constantly proportional to the advance of the said power piston during a portion of its stroke.

6. An internal combustion engine which comprises a power cylinder and a piston therefor, means for compressing and supplying air to said power cylinder, an admission valve for said compressed air and means driven by said engine for opening said admission valve to an extent constantly proportional to the advance of the said power piston during a portion of its stroke, and continuously variable means for terminating the admission of said air and fuel after any desired fraction of the power stroke.

7. In an internal combustion engine which comprises a power cylinder and piston, means for compressing and supplying air to said power cylinder, an admission valve for said air, a cam of continuously increasing length of such a profile as will vary the opening of said valve to a degree proportional to the advance of the power piston.

8. In an internal combustion engine, a power cylinder, a piston therein, means for compressing air for combustion and supplying said air to said power cylinder, an admission valve for air admitted to said power cylinder and means for opening said valve by increments proportional to the rates of advance of the power piston, and a fuel supply and spraying device for injecting finely divided liquid fuel into said air and means for supplying said liquid fuel at rates proportional to the varying speed of the power piston.

9. An internal combustion engine which comprises a power cylinder, a piston therein, means for compressing air for combustion and supplying said air to said power cylinder, an admission valve for said air, means for opening said admission valve by increments proportional to the rates of advance of the power piston and means for gradually and continuously controlling fractions of the power stroke during which said air is admitted, and means for feeding a supply of finely divided liquid fuel into said admitted air in quantities proportional to the speed of the power piston during said variable and controllable fractions of the power stroke.

10. An internal combustion engine which comprises power cylinders, pistons therein, means for compressing air for combustion and supplying it to said power cylinders, admission valves for said air supplied to said power cylinders, means for opening said admission valves by increments proportional to the rates of advance of the power pistons during a fraction of the power stroke, means for supplying and spraying finely divided liquid fuel into said air during its passage to the power cylinders in quantities proportional to the speed of the power pistons, means for continuously and gradually controlling that fraction of the power stroke during which the said air and fuel are admitted, and means for igniting the admitted fuel and air and for reversing the flow of the products of combustion into a direction counter to all succeeding fuel and air.

11. An internal combustion engine which comprises power cylinders, means for compressing air for combustion and supplying said air to said power cylinders, means for admitting said air to said power cylinders, means for supplying fuel in finely divided condition to said admitted air and in a definite proportion thereto, and means for controlling by continuously graduated increments the fraction of said stroke during which the said air and fuel are admitted.

12. An internal combustion engine which comprises power cylinders, means for compressing air for combustion and supplying said air to the power cylinders, means for supplying finely divided liquid fuel and said air in definite rates of each component to effect substantially uniform portions of each during variable and controllable fractions of the power stroke.

13. In an internal combustion engine which comprises power cylinders and pistons therein, means for compressing air for combustion and supplying said air to said power cylinders, means for admitting air to said power cylinders at a rate proportional to the speed of movement of said pistons during a variable and controllable fraction of the power stroke, means for adding thereto finely divided fuel in a substantially equal ratio and for burning this fuel progressively during said variable and controllable period.

14. In an internal combustion engine which comprises power cylinders and pistons therein, means for compressing air for combustion and supplying said air to said power cylinders, means for admitting air to said power cylinders at a rate proportional to the speed of movement of said pistons during a variable and controllable fraction of the power stroke, means for adding thereto finely divided fuel in a substantially equal ratio and for burning this fuel progressively during said variable and controllable period at substantially constant pressure.

15. In an internal combustion engine which comprises power cylinders and pistons therein, means for compressing air for combustion and supplying said air to said power cylinders, means for admitting air to said power cylinders at a rate proportional to the speed of movement of said pistons during a variable and controllable fraction of the power stroke, means for adding thereto finely divided fuel in a substantially equal ratio and for burning this fuel progressively during said variable and controllable period at substantially constant pressure and at substantially uniform temperature.

16. In an internal combustion engine, a cylinder and piston therefor, means for compressing the air of combustion externally to the power cylinder, a valve for said cylinder for admitting this air thereto, means for controlling the operation of said valve through variable fractions of the power stroke and for definitely and gradually varying the opening of said valve proportionately with the advance of the power piston, and means for gradually spraying this air with finely divided fuel at rates proportional to said advance of the power piston during variable and controllable fractions of the power stroke.

17. In an internal combustion engine, a cylinder and piston therefor, means for compressing the air of combustion externally to the power cylinder, means for admitting air thereto at gradually varying rates during controllable fractions of the power stroke and in proportion to the changes in speed of the power piston, means for spraying said air with finely divided fuel at definite rates of delivery, means beyond the point of admission for igniting the earliest portions of each charge in the presence of the accompanying air of combustion.

18. In an internal combustion engine wherein the air of combustion is compressed by means external to the power cylinders, means for admitting air and fuel to said power cylinders, means for controlling the admission of said air and said fuel and a governing means for said controlling means operable to admit said air and fuel in gradually varying rates of each during a portion of the power stroke, and means for controlling the length of said period of admission.

19. In an internal combustion engine comprising a power cylinder and piston therefor, means for compressing the air of combustion externally to the power cylinder, an admission valve for the power cylinder, means for varying the opening of said valve continuously and gradually by increments proportional to the changing rates of the power piston for variable and controllable fractions of the power stroke and a spraying device for adding finely divided liquid fuel to said air in quantities proportional to the speed of the power stroke for variable and controllable fractions of the power stroke.

20. In an internal combustion engine comprising a power cylinder and piston therefor, means for compressing the air of combustion externally of the power cylinder, an admission valve for the power cylinder, means for varying the opening of said valve continuously and gradually by increments proportional to the acceleration of the power piston during variable and controllable fractions of the power stroke, a spraying device for adding finely divided liquid fuel to said air during such variable and controllable fractions of the power stroke, means for providing the said finely divided liquid fuel in quantities proportional to the speed of the power piston, means beyond the port of admission for arresting the flow of the components of each charge and means at the point of arrest for igniting the fuel content.

21. A method of operating internal combustion engines which comprises admitting air under pressure to the power cylinder of an internal combustion engine at a rate proportional to the speed of the power piston, injecting fuel and spraying it into said air at a rate proportional to the admission of said air, igniting the mixture of fuel and air and for redirecting the burning mixture into a flow counter to that of any and all succeeding mixture of fuel and air.

22. A method of operating an internal combustion engine which consists of externally compressing the air of combustion, continuously and gradually admitting this air by graduated increments proportional to changes in rate of admission and delivering thereto a spray of finely divided fuel at progressively graduated rates to form charges of fuel and air to produce a nonexplosive combustion for variable and controllable fractions of the power stroke.

23. A method of operating an internal combustion engine which comprises compressing air for combustion external to the power cylinders of said engine, admitting said air to said power cylinders at rates proportional to the rate of advance of the power pistons and feeding liquid fuel and spraying it into said air for combustion at rates proportional to the varying speed of the power pistons.

24. A method of operating internal combustion engines which comprises means for compressing air for combustion and feeding said air to the power cylinders at rates proportional to the rate of advance of the power pistons, feeding finely divided liquid fuel into said air and said power cylinders at rates proportional to the admission of said air and to the speed of said power pistons, and means for gradually and continuously varying the fraction of said power stroke during which said air and fuel are supplied.

25. A method of operating internal combustion engines which comprises compressing air for combustion and admitting said air to the power cylinder of an internal combustion engine at a rate proportional to the rate of advance of the power piston during a portion of the power stroke, spraying liquid fuel into said air at a rate proportional to the admission of air and speed of said piston, igniting said admitted fuel and air and directing said ignited fuel and air backwardly against the entering air and fuel.

26. A method of operating an internal combustion engine which comprises delivering fuel and air for its combustion to the power cylinder of an internal combustion engine at a rate proportional to the advance of the power piston for any variable and controllable fraction of the power stroke while maintaining in said power cylinder a substantially constant pressure of combustion.

JOHN H. BARNARD.